United States Patent
Ortman et al.

(10) Patent No.: US 8,742,715 B2
(45) Date of Patent: Jun. 3, 2014

(54) SYSTEM AND METHOD FOR PROVIDING CONTROL OF AN ELECTRIC MOTOR USING INDUCTIVE ROTARY SENSOR

(75) Inventors: Michael Jules Ortman, Springfield, NJ (US); William L. Kenly, V, Kinnelon, NJ (US)

(73) Assignee: Simmonds Precision Products, Inc., Vergennes, VT (US)

(*) Notice: Subject to any disclaimer, the term of this patent is extended or adjusted under 35 U.S.C. 154(b) by 66 days.

(21) Appl. No.: 13/156,996

(22) Filed: Jun. 9, 2011

(65) Prior Publication Data
US 2012/0313565 A1    Dec. 13, 2012

(51) Int. Cl.
G05B 1/06    (2006.01)

(52) U.S. Cl.
USPC ...... 318/660; 318/661; 318/400.39; 310/68 B

(58) Field of Classification Search
USPC ............. 318/660, 661, 400.39; 310/68 B
See application file for complete search history.

(56) References Cited

U.S. PATENT DOCUMENTS

| | | |
|---|---|---|
| 4,075,551 A | 2/1978 | Zabler |
| 4,092,579 A | 5/1978 | Weit |
| 4,255,682 A | 3/1981 | Toida et al. |
| 4,259,628 A * | 3/1981 | Iwakane et al. ............... 318/799 |
| 4,587,469 A * | 5/1986 | Ikebe et al. .................... 318/432 |
| 4,631,510 A | 12/1986 | Nagarkatti et al. |
| 4,837,473 A | 6/1989 | Matuda et al. |
| 4,893,078 A | 1/1990 | Auchterlonie |
| 4,918,997 A | 4/1990 | Pouillange |
| 5,003,260 A | 3/1991 | Auchterlonie |
| 5,214,378 A | 5/1993 | Hore |
| 5,239,288 A | 8/1993 | Tsals |
| 5,406,155 A * | 4/1995 | Persson ...................... 310/68 B |
| 5,425,073 A | 6/1995 | Bitzer et al. |
| 5,521,494 A | 5/1996 | Hore et al. |
| 5,642,044 A | 6/1997 | Weber |
| 5,903,205 A | 5/1999 | Goto et al. |
| 6,045,262 A * | 4/2000 | Igeta et al. .................... 378/209 |
| 6,084,376 A | 7/2000 | Piedl et al. |
| 6,166,535 A | 12/2000 | Irle et al. |
| 6,343,670 B1 | 2/2002 | Mindl et al. |
| 6,366,078 B1 | 4/2002 | Irle et al. |
| 6,384,597 B1 | 5/2002 | Irle et al. |
| 6,384,598 B1 | 5/2002 | Hobein et al. |
| 6,483,295 B2 | 11/2002 | Irle et al. |
| 6,642,711 B2 | 11/2003 | Kawate et al. |
| 6,734,665 B2 | 5/2004 | Jagiella et al. |
| 6,847,179 B2 | 1/2005 | Du et al. |

(Continued)

FOREIGN PATENT DOCUMENTS

DE    19941464 A1    3/2001

*Primary Examiner* — Erick Glass
(74) *Attorney, Agent, or Firm* — Edwards Wildman Palmer LLP; Scott D. Wofsy; Christopher J. Capelli

(57) ABSTRACT

A sensor system for providing control of an electric motor having an inductive angle sensor system including a first inductive coil configured for affixation to a rotor shaft of the electric motor wherein rotation of the rotor shaft causes corresponding rotation of the first inductive coil. A second inductive coil fixedly mounted in spaced relationship to the first inductive coil. An evaluation circuit coupled to the second inductive coil and to the electric motor operative to determine a rotor shaft angle for the rotor shaft of the electric motor through evaluation of an induced magnetic field between the first and second inductive coils.

5 Claims, 3 Drawing Sheets

(56) References Cited

U.S. PATENT DOCUMENTS

| | | |
|---|---|---|
| 6,891,346 B2 | 5/2005 | Simmons et al. |
| 6,943,543 B2 | 9/2005 | Gass et al. |
| 7,135,855 B2 | 11/2006 | Nyce |
| 7,157,903 B2 | 1/2007 | Rissing |
| 7,190,158 B2 | 3/2007 | Tiemann |
| 7,208,945 B2 | 4/2007 | Jones et al. |
| 7,221,154 B2 | 5/2007 | Lee |
| 7,319,319 B2 | 1/2008 | Jones et al. |
| 7,345,473 B2 | 3/2008 | Lee |
| 7,508,154 B1 * | 3/2009 | Labriola, II ............ 318/602 |
| 7,723,942 B1 * | 5/2010 | Labriola, II ............ 318/601 |
| 7,868,609 B2 | 1/2011 | Zhitomirskiy |
| 2012/0313565 A1 | 12/2012 | Ortman et al. |

* cited by examiner

SYSTEM AND METHOD FOR PROVIDING CONTROL OF AN ELECTRIC MOTOR USING INDUCTIVE ROTARY SENSOR

FIELD OF THE INVENTION

The present invention generally relates to a control system having an inductive angle sensor, and more particularly, the present invention relates to adjusting operating parameters of an electric motor through feedback from an inductive angle sensor.

BACKGROUND OF THE INVENTION

In motor control the highest performance can be achieved when accurate motor rotor angular position and velocity information are available. Various technologies have been used to measure the shaft angle like hall-effect angle sensing with a tachometer for velocity sensing. Another common solution has been the use of a resolver, paired with a resolver to digital converter.

A rotating electric resolver is an electromagnetic device which is used to accurately indicate the angular position of the rotor with reference to some fixed frame of reference. A typical embodiment of such a resolver comprises an input winding and a pair of output windings. The output windings are typically identical to each other but are wound with a 90 degree phase displacement relative to each other.

These technologies, while effective, are costly and large in both physical size and weight.

SUMMARY OF THE INVENTION

The present invention utilizes an inductive rotary sensor to derive rotor position and velocity information from a rotor shaft of an electric motor for subsequent use with commutation and/or feedback control of the electric motor.

A sensor system for providing control of a multi phase electric motor in a closed loop feedback circuit is described in which an aspect of the invention includes an inductive angle sensor system. The inductive angle sensor system includes a first inductive coil configured for affixation to a rotor shaft of the electric motor such that rotation of the rotor shaft causes corresponding rotation of the first inductive coil. A second inductive coil is fixedly mounted in spaced relationship to the first inductive coil wherein the second inductive coil has a multi-phase winding. Coupled to the inductive angle sensor system is an evaluation circuit coupled to the second inductive coils and to the electric motor. The evaluation circuit being operative to measure voltages in each phase winding of the second inductive coil caused by rotation of the first inductive coil. The first inductive coil induces a magnetic field between the first and second inductive coils creating voltage changes in the second inductive coil depending on the angular relationship between the two coils. The evaluation circuit is operative to deter nine the rotor shaft angle for the rotor shaft by measuring voltages in the second inductive coil. The evaluation circuit is further operative to control electrical current distribution in the electric motor in dependence upon the determined rotor shaft angle for the rotor shaft. Power for exciting the first inductive coil is magnetically induced so that electrical connections to the first inductive coil are not needed.

In another aspect of the invention, the evaluation circuit is further operative to determine rotation speed for the rotor shaft through evaluation of the measured voltages of second inductive coil and is further operative to adjust the rotation speed for the rotor shaft to a desired speed. This velocity information can also be used to provide feedback loop damping in velocity and position control loops. In yet another aspect of the invention, the evaluation circuit is further operative to determine rotation position for an output load coupled to the rotor shaft and is further operative to adjust the rotation position of the rotor shaft to a desired position in dependence upon the determined position of the output load coupled to the rotor shaft. In yet another aspect of the invention, a second angle sensor system is further operative to determine rotation position for an output load coupled to the motor rotor shaft and is further operative to adjust the rotation position of the motor rotor shaft in order to adjust the determined position of the output load to a desired position.

BRIEF DESCRIPTION OF THE DRAWINGS

The objects and features of the invention can be understood with reference to the following detailed description of an illustrative embodiment of the present invention taken together in conjunction with the accompanying drawings in which.

WRITTEN DESCRIPTION OF CERTAIN EMBODIMENTS OF THE INVENTION

The present invention is now described more fully with reference to the accompanying drawings, in which an illustrated embodiment of the present invention is shown. The present invention is not limited in any way to the illustrated embodiments as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

It is to be appreciated and understood that the present invention, in accordance with the illustrated embodiments, is directed to a system and method for providing control of an electric motor in a control system using an inductive angle sensor. Motor commutation and/or feedback control is provided. It is to be understood and appreciated that in motor control the highest performance is typically achieved when accurate motor rotor angular position and velocity information are available. In this regard, the present invention, in accordance with the illustrated embodiments, utilizes an inductive rotary sensor to determine an electric motor's rotor shaft position and velocity for commutation, closed loop velocity control, and closed loop rotational position control of the electric motor. As also discussed below, servo position control at the output of an actuator can also be implemented from a common sensor. Also, better servo position control at the output of an actuator can be implemented using a second sensor mounted at the output of the actuator.

As will be apparent from the below description in accordance with the illustrated embodiments of FIGS. 1 and 2, the present invention is to be understood to be implemented in conjunction with a multi-pole winding electric motor 100. For ease of description, the electric motor 100 is to be understood to be a 6-pole electric motor 100 and the illustrated inductive angle sensor system 10 is to be understood to be a six pole sensor circuit. However, the present invention is not to be understood to be limited for use with such a 6-pole electric motor and an inductive angle sensor system 10 having six poles as a variety of multi-pole electric motors and an inductive angle sensor system having any plurality of poles may be implemented.

Figure 1:
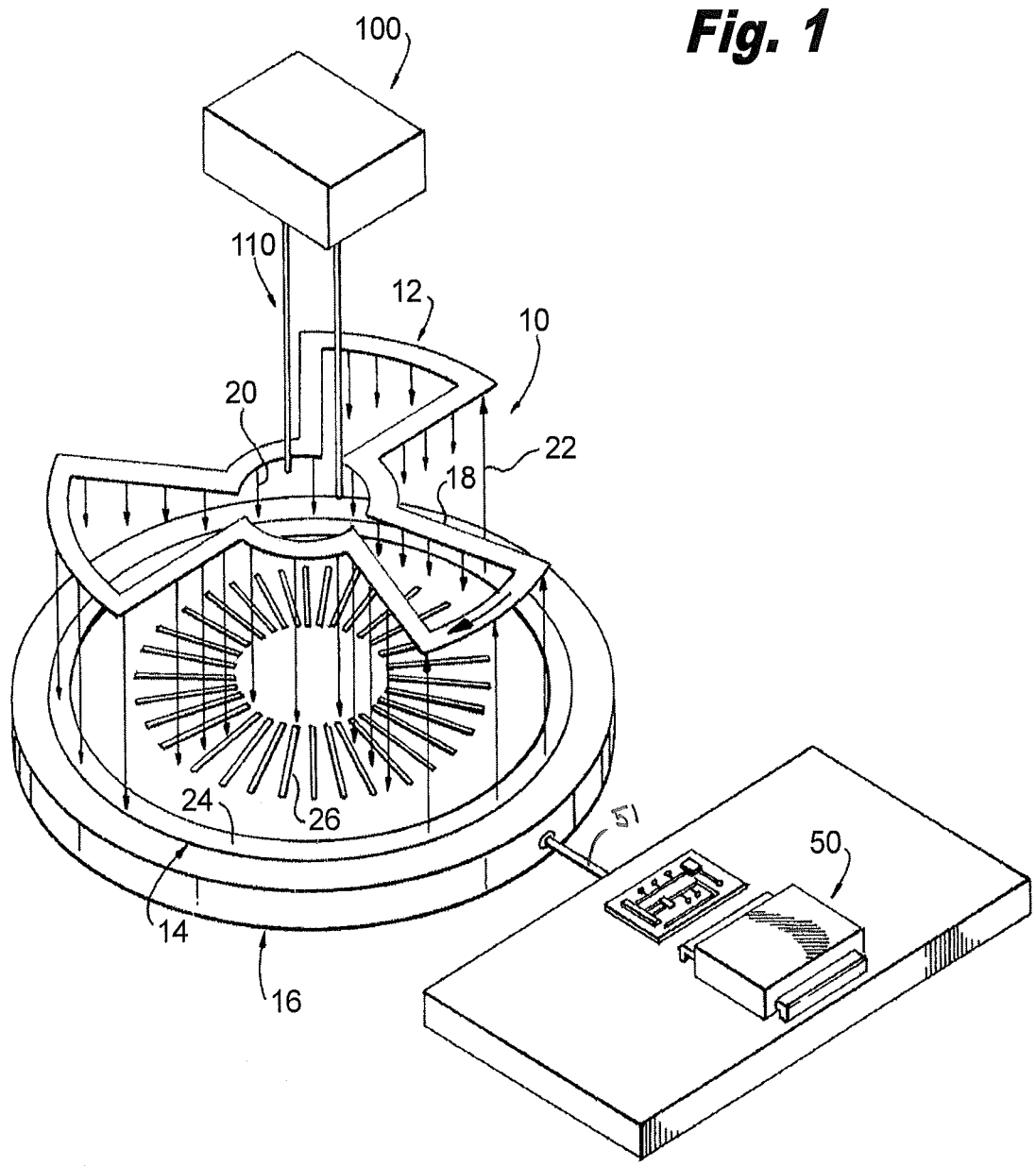
FIG. 1 illustrates an exemplary inductive angle sensor used in accordance with the present invention.

With reference to FIG. 1, and as further discussed below, inductive angle sensor system 10 is shown to include a rotary sensor coil 12 affixed to rotation shaft 110 of electric motor 100 wherein rotation of shaft 110 causes corresponding rotation of the rotary sensor coil 12. Inductive angle sensor system 10 further includes stationary sensor coils 24 and 26 preferably affixed to a circuit board 16 (such as a PCB board) which is stationary relative to rotary sensor coil 12. Electric currents imparted in the stationary excitation coil 24 produce magnetic fields which correspondingly induce electric currents in the rotary coil 12. These induced electric currents in the rotary coil 12 produce magnetic fields that induce voltages in the stationary receiving coil 26. The voltages induced in the stationary receiving coil 26 are measured by an evaluation circuit 50 configured and operative to do so. The evaluation circuit 50 is preferably coupled to circuit board 16 through any known coupling means 51 (e.g., via a wire, trace, socket connection, RF and the like). As also further discussed below, the measured voltages in the stationary receiving coil 26 are utilized to preferably determine rotor shaft angle and velocity of the rotation shaft 110 of the electric motor 100.

It is further to be understood that, and as mentioned above, such an inductive angle sensor system 10 is well known in the art, thus one skilled in the art readily understands it's assembly and operation. Thus, since the present invention concerns the control of an electric motor system 100 by voltage measurements of an inductive angle sensor system 10, and not the actually assembly and method of operation of such known inductive angle sensor systems, a general description need only be provided of such an inductive angle sensor system, as one skilled in the art readily understands its assembly and operation.

Accordingly, the exemplary inductive angle sensor system 10 illustrated in FIG. 1 is to be understood to be a rotary transformer wherein the stationary receiving coil 26 is preferably a three or two phase circuit. Thus, for ease of description of the present invention, the following description applies for a three phase stationary receiving coil 26. First, a sinusoidal excitation signal is applied to stationary transmission coil 24, which, by transformer action, excites a sinusoidal current in the outer circumference of the rotor trace, known as the rotor coil 12. It is to be appreciated that on the inside of the transmission coil 24 is a three phase winding called the receiving coil 26.

In operation, the currents in the rotor spoke traces 18 (of rotor coil 12) induce voltages in the three staggered stationary receive coils 26 positioned parallel to the rotary coil spokes. It is to be appreciated the aforesaid three receive coils 26 of the stationary sensor coil(s) 14 are preferably 120 degrees spaced from each other within a periodic sector. Thus, it is to be understood that depending on the angular location of the rotor spoke traces 18, a different amount of transformer coupling exists with each of the three receiving coils 26. That is, the receiving coil 26 beneath a rotor spoke 18 will exhibit the greatest AC voltage amplitude and the receiving coil 26 farthest from being beneath a rotor spoke 18 will exhibit the smallest AC voltage amplitude. It is to be understood, "farthest" means equally distant between two spokes 18.

It is also to be appreciated that since in the illustrated embodiment of FIG. 1 there are six rotor spokes 18 in the rotary sensor coil 12, the windings of the stationary receive coil 26 are preferably arranged so that a particular winding has six series traces that will pickup the coupling equally from each of the six rotor spokes 18 in the rotary sensor coil 12. It is further to be appreciated that each spoke 18 may consist of several adjacent series connected spokes in the stationary receiving coil 26. It is to be understood and appreciated the three windings of the stationary receiving coil 26 are connected in a "Y" configuration although other connection methods are possible. Therefore, as the rotation shaft 110 and affixed rotary sensor coil 12 rotates, the amplitude of the voltages of each of the three receiving coils 26 of the stationary sensor coil 14 varies in a three phase generally sinusoidal manor.

It is further to be appreciated and understood that the illustrative embodiment of FIG. 1 depicts an inductive angle sensor 10 having 6 poles. The inductive angle sensor 10 used with the present invention is not to be understood to be limited to 6 poles as it may be designed for a varying multitude of poles (e.g., 2, 4, 6, 8, 10, etc.). Thus, the stationary sensor receiving coil 26 angular location and the number of poles of the rotary sensor coil 12 can accordingly be modified to accommodate a corresponding number of poles. For instance, a six pole design produces three electrical cycles for one mechanical revolution of the rotary sensor coil 12. Thus, in one embodiment the number of poles of the inductive angle sensor 10 should match that of the associated motor 100.

It is to be understood and appreciated another illustrative embodiment may have a 2-pole sensor, with one electrical revolution corresponding to one mechanical revolution, used to control a motor of an arbitrary number of poles N. In this arrangement an algorithm would be used to map the rotation angle of a 2 pole sensor to the commutation requirements of a greater than 2 pole motor.

With regards to the evaluation circuit 50, it is configured and operative to measure the relative amplitudes between the receiving coils 26. Preferably using trigonometric principles (as is readily understood by one skilled in the art), the rotor angle for rotation shaft 110 is calculated by the evaluation circuit 50 within a periodic sector of the sensor. A sector is 360 degrees for a 2 pole sensor. A sector is 180 degrees for a 4 pole sensor. A sector is 120 degrees for a 6 pole sensor as in the example above. A sector is 90 degrees for a 8 pole sensor. The number of sensor poles would be chosen based on the objectives of a particular application.

With the principles of the inductive angle sensor 10 described above, the present invention is further described with reference to FIG. 2 (and with continuing reference to FIG. 1). It is to be appreciated the illustrative embodiment of FIG. 2, couples an inductive angle sensor 10, via rotation shaft 110, to a Brushless DC driven motor (BLDC) 100. A BLDC motor requires commutation information to be generated by the inductive rotary sensor for proper operation. Other motor types do not require commutation information and the rotary inductive sensor would be used in that case to provide other beneficial information. The evaluation circuit 50 is configured and operative to calculate commutation information to be input to a power amplifier component 200 which selectively supplies current to the windings of the motor 100 to control commutation. As mentioned above, the commutation inforniation for motor 100 is determined based upon the angle of the rotation shaft 110 as determined by the evaluation circuit 50 via the measured voltages in the inductive angle sensor system 10.

In the illustrated embodiment, the aforesaid commutation information input to the power amplifier component 200 are preferably three digital signals wherein the code of the signals cause electrical current to be applied to appropriate windings of the motor 100 to maintain proper commutation of the motor 100. Thus, the evaluation circuit 50 determines which winding of the 6 pole motor 100 is to receive electrical current based upon the measured voltages in the inductive angle sensor system 10, which indicates the current angle of the rotation shaft 110. In essence, this information allows the power amplifier 200 to insert current into the correct motor windings at the correct shaft angle for proper operation.

Figure 2:
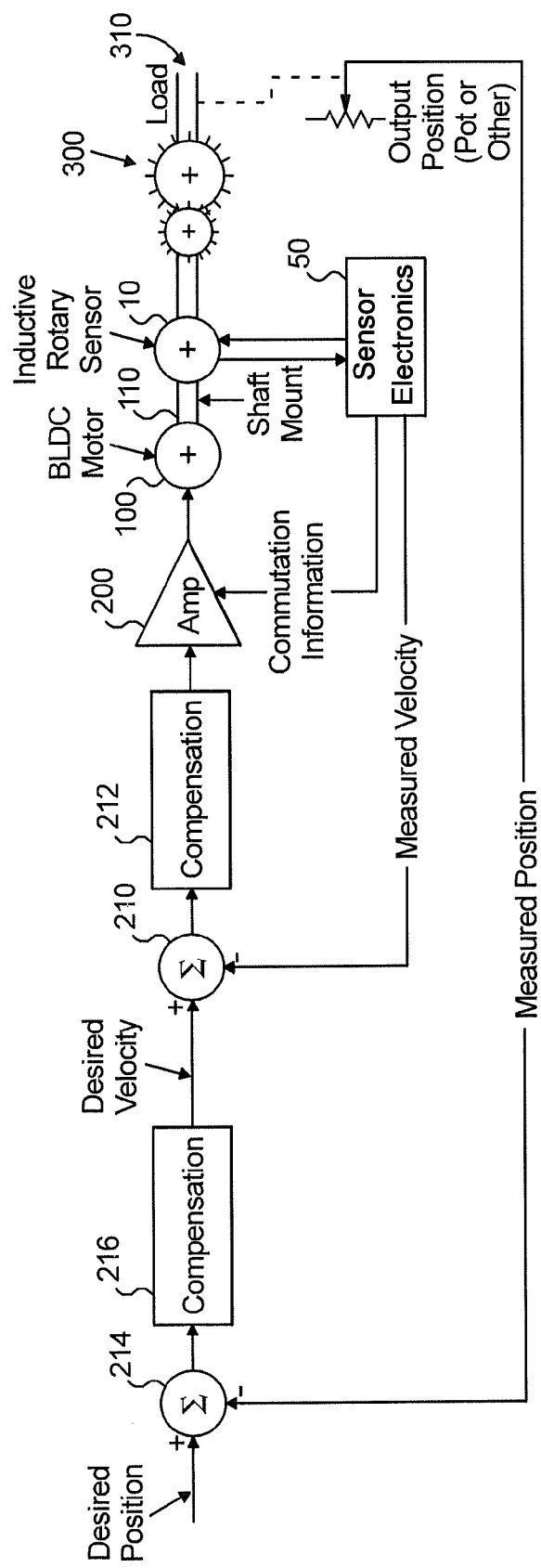
FIG. 2 depicts a circuit schematic of an illustrated embodiment of the present invention system and method for providing commutation and/or closed loop feedback control of an electric motor.

In accordance with the illustrated embodiment of FIG. 2, the present invention also produces rotor velocity information for shaft 110 which can be beneficial in numerous feedback loop compensation schemes. For instance, in the exemplary embodiment of FIG. 2, shown is a velocity control loop, wherein based upon the voltage measurements of the inductive angle sensor system 10, the evaluation circuit 50 determines the shaft velocity for shaft 110, which velocity speed information is sent to a velocity comparator circuit 210. The velocity comparator circuit 210 compares the current velocity speed information of shaft 110 (as received from evaluation circuit 50) with a signal indicating a desired speed for shaft 110 and determines a difference between the aforesaid two speed signals which difference is applied in the form of a gain signal to a speed compensation pre-amplifier component 212. The speed compensation pre-amplifier component 212 then instructs (via the gain signal) the power amplifier 200 to either increase or decrease the amount of electrical current applied to the motor 100 so as to either decrease or increase the velocity speed of shaft 110 so as to equal the aforesaid desired velocity speed.

Figure 3:
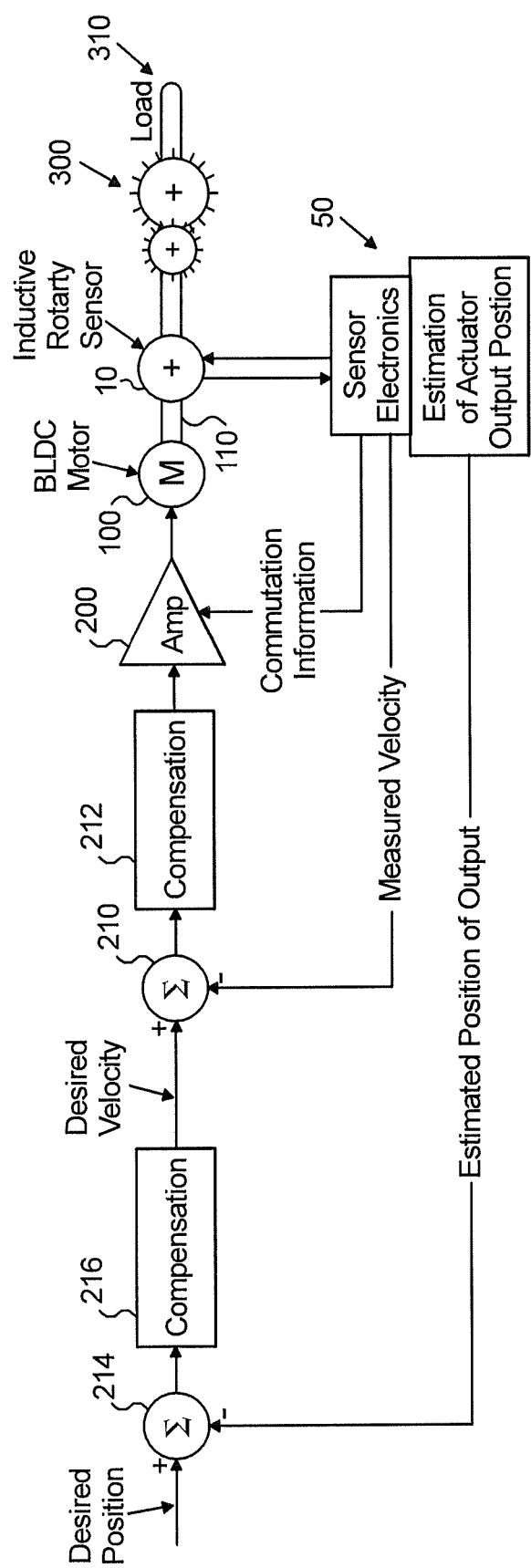
FIG. 3 depicts a circuit schematic of another illustrated embodiment of the present invention system and method for providing commutation and/or closed loop feedback control of an electric motor.

Additionally in accordance with the illustrated embodiment of FIG. 3, the present invention, preferably via evaluation circuit 50, may be further configured and operative to produce position information for the output 310 (e.g., a gear pass, crank arm or the like) coupled to rotor shaft 110 which is utilized in a position control servo system, in conjunction with the aforesaid a velocity loop, so as to provide damping for the position control feedback loop.

As illustrated in the illustrative embodiments of FIGS. 2 and 3, the position control servo system preferably consists of a position comparator circuit 214 coupled to a position compensation pre-amplifier component 216. The position of the output load 300 of the rotor shaft 110 is preferably determined by circuitry coupled to the output load 300 of the rotor shaft 110 which position information is sent to the position comparator circuit 214. The position comparator circuit 214 compares the current position information of the output load 300 of the shaft 110 (as received from evaluation circuit 50) with a signal indicating a desired position for the output load 300 of shaft 110 and determines a difference between the aforesaid two position signals which difference is applied in the form of a position difference signal to the position compensation pre-amplifier component 216. The position compensation pre-amplifier component 216 then determines a desired velocity for shaft 110 to position its output load 300 to a desired position, which is input to velocity comparator circuit 210 as mentioned above. It is to be understood and appreciated the aforesaid position control servo system, in the illustrated embodiment, is a second order loop providing damping compensation to eliminate oscillation of shaft 110, thus in this illustrative embodiment, the position loop is "outside" of the velocity loop.

It is further to be understood and appreciated that in addition to using the inductive rotary sensor system 10 for determining the position and velocity of a rotor shaft 110, other embodiments of the present invention may incorporate additional circuitry to determine motor shaft revolutions. For instance, a common sensor may be used to derive position at the output of a gear pass or crank arm. Additionally, the evaluation circuit 50 may be operative and configured to utilize the determined velocity of shaft 110 in a velocity control loop for the motor or to provide damping for a feedback loop. Still further, the invention may be operative and configured such that the aforesaid inductive rotary sensor 10 can be used with motors 100 not requiring commutation (e.g., brush motors) but feedback information for control thereof Optional embodiments of the present invention may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

The above presents a description of a best mode contemplated for carrying out the present invention system and method for providing closed loop feedback control and/or commutation of an electric motor, and of the manner and process of making and using them, in such full, clear, concise, and exact terms as to enable any person skilled in the art to which it pertains to make and use these devices and methods. The present invention system and method for providing closed loop feedback control and/or commutation of an electric motor is, however, susceptible to modifications and alternative method steps from those discussed above that are fully equivalent. Consequently, the present invention system and method for providing closed loop feedback control of an electric motor is not limited to the particular embodiments disclosed. On the contrary, the present invention system and method for providing closed loop feedback control and/or commutation of an electric motor encompasses all modifications and alternative constructions and methods coming within the spirit and scope of the present invention.

The descriptions above and the accompanying drawings should be interpreted in the illustrative and not the limited sense. While the invention has been disclosed in connection with the preferred embodiment or embodiments thereof, it should be understood that there may be other embodiments which fall within the scope of the invention as defined by the following claims. Where a claim, if any, is expressed as a means or step for performing a specified function, it is intended that such claim be construed to cover the corresponding structure, material, or acts described in the specification and equivalents thereof, including both structural equivalents and equivalent structures, material-based equivalents and equivalent materials, and act-based equivalents and equivalent acts.

What is claimed is:

1. A sensor system for providing commutation control of an electric motor, comprising:
   an inductive angle sensor system including:
   a first inductive coil configured for affixation to a rotor shaft of the electric motor, the first inductive coil including a multi-pole winding, wherein rotation of the rotor shaft causes corresponding rotation of the first inductive coil;

a second inductive coil fixedly mounted in spaced relationship to the first inductive coil, the second inductive coil including a multi-phase winding, wherein each of the first and second inductive coils has equal number of phases;

an evaluation circuit coupled to the second inductive coil and to the electric motor operative to determine a rotor shaft angle for the rotor shaft of the electric motor through determining an induced voltage in each phase winding of the multi-phase winding in the second inductive coil created by position of the first inductive coil which creates a magnetic field between the first and second inductive coils and further operative to control electrical current distribution to the electric motor in dependence upon the determined rotor shaft angle of the rotor shaft; and an output load detector circuit that is separate from the evaluation circuit and is coupled to an output load of the rotor shaft of the electric motor operative to determine a difference between a current position of an output load coupled to the rotor shaft and a desired position for the output load.

2. A sensor system for providing commutation control of a motor as recited in claim 1 wherein the second inductive coil has a three phase winding.

3. A sensor system for providing commutation control of a motor as recited in claim 1 wherein the evaluation circuit is coupled to an amplifier component such that the evaluation circuit is operative to cause the amplifier component to selectively distribute electrical current to at least one prescribed winding in the electric motor to control the shaft angle of the rotor shaft for the electric motor.

4. A sensor system for providing feedback control of a motor as recited in claim 1 wherein the evaluation circuit is further operative to determine rotation speed for the rotor shaft through evaluation of the induced magnetic field between the first and second inductive coils and being further operative to adjust the rotation speed for the rotor shaft to a desired speed.

5. A sensor system for providing feedback control of a motor as recited in claim 1 wherein the output load detector circuit is further operative to adjust the rotation position of the rotor shaft output load to the desired position in dependence upon the determined position of the rotor shaft output load.

* * * * *